Figure 6:
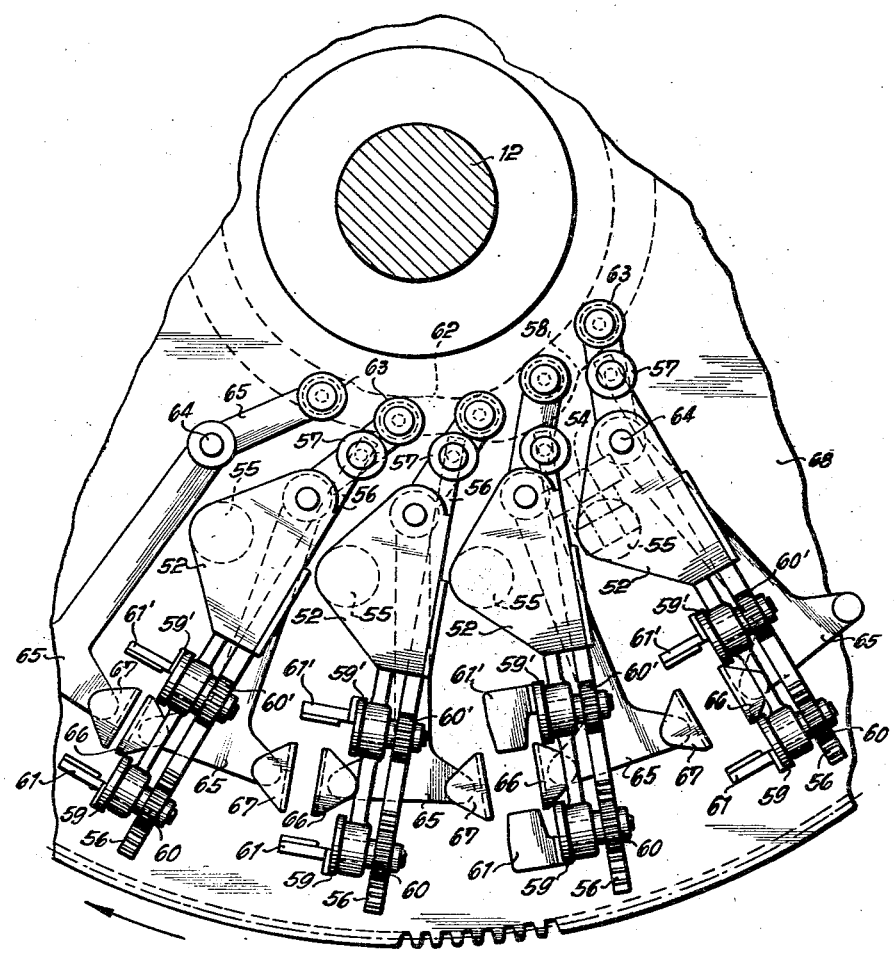

Jan. 28, 1958 A. RITSCHER 2,821,054
APPARATUS FOR PRODUCING CIGARETTE PACKAGES AND THE LIKE
Filed June 30, 1954 7 Sheets-Sheet 1
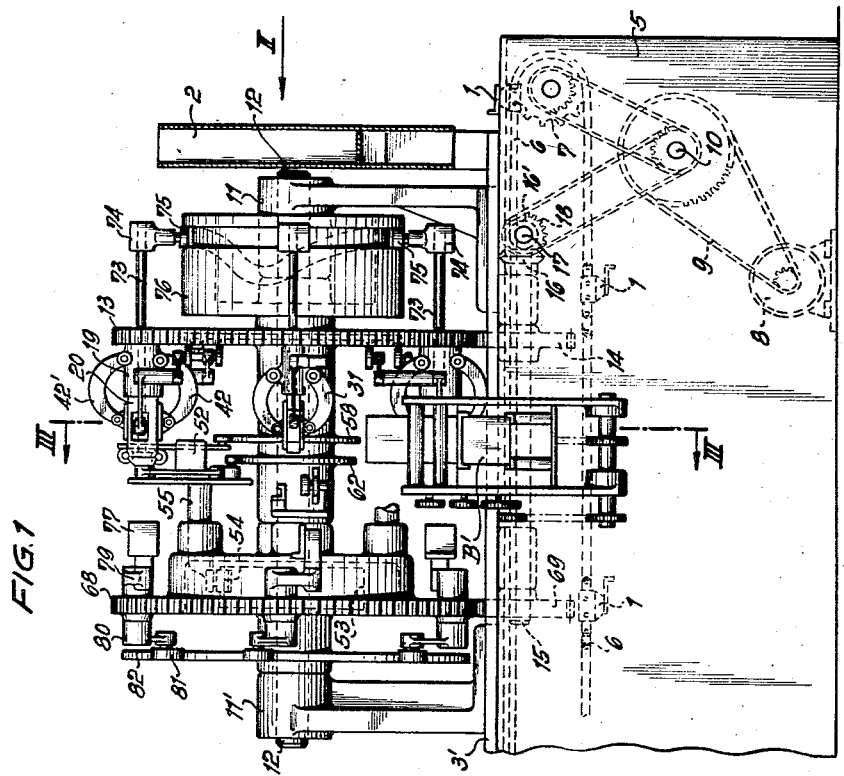
INVENTOR:
Arthur Ritscher,
by Singer, Stern & Carlberg
Attorneys.

Jan. 28, 1958  A. RITSCHER  2,821,054
APPARATUS FOR PRODUCING CIGARETTE PACKAGES AND THE LIKE
Filed June 30, 1954  7 Sheets-Sheet 2
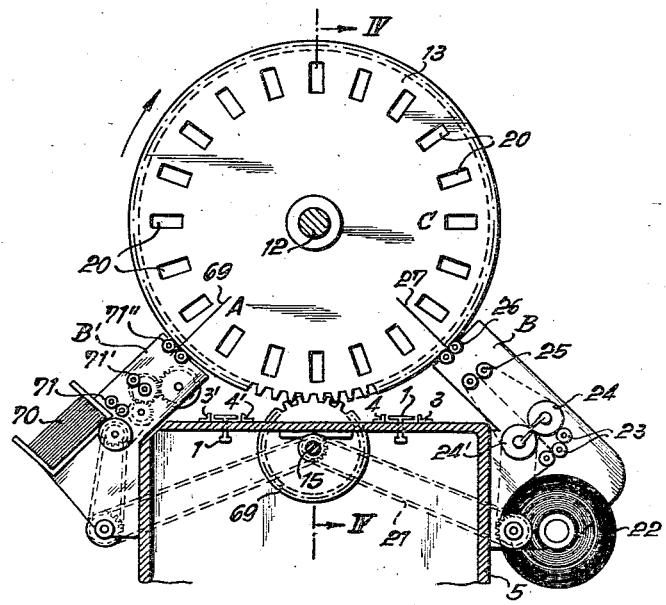
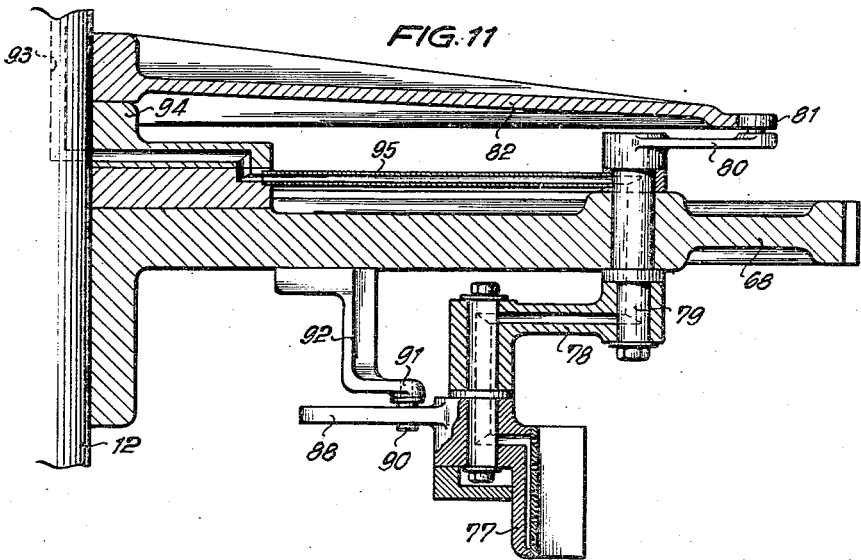
INVENTOR:
Arthur Ritscher,
by Singer, Stern & Carlberg,
Attorneys.

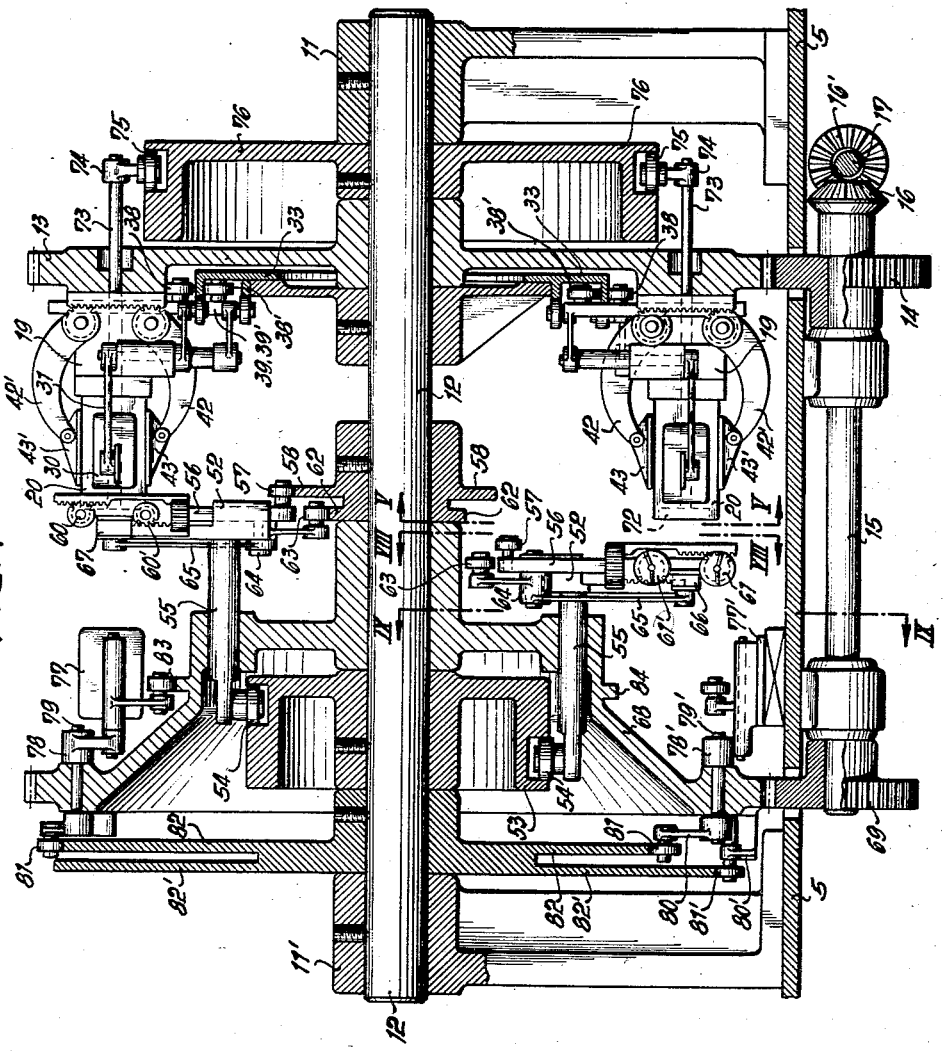

Jan. 28, 1958     A. RITSCHER     2,821,054
APPARATUS FOR PRODUCING CIGARETTE PACKAGES AND THE LIKE
Filed June 30, 1954     7 Sheets-Sheet 4
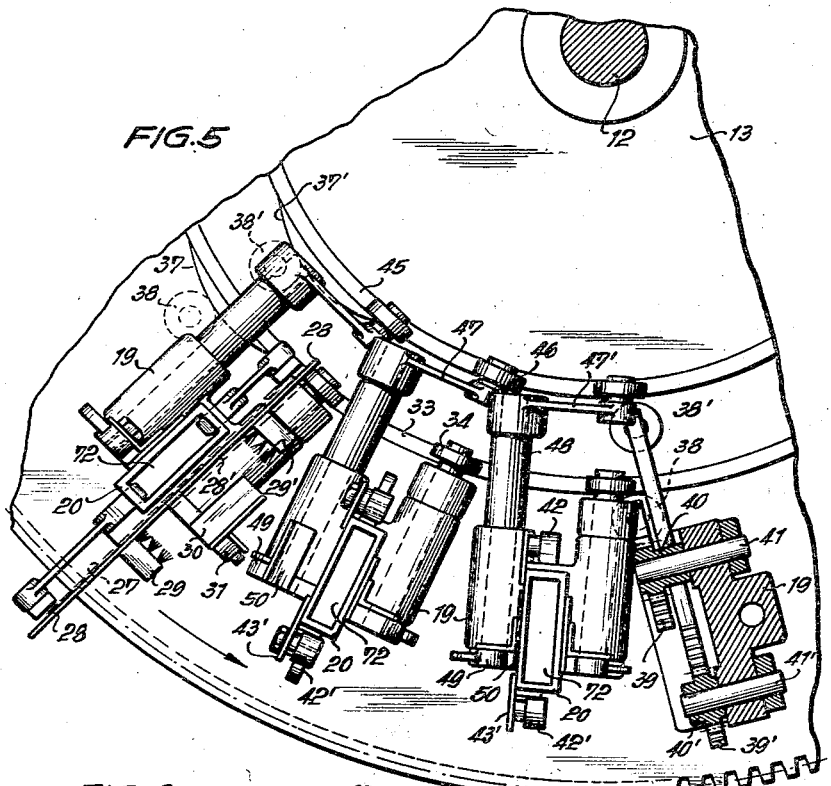
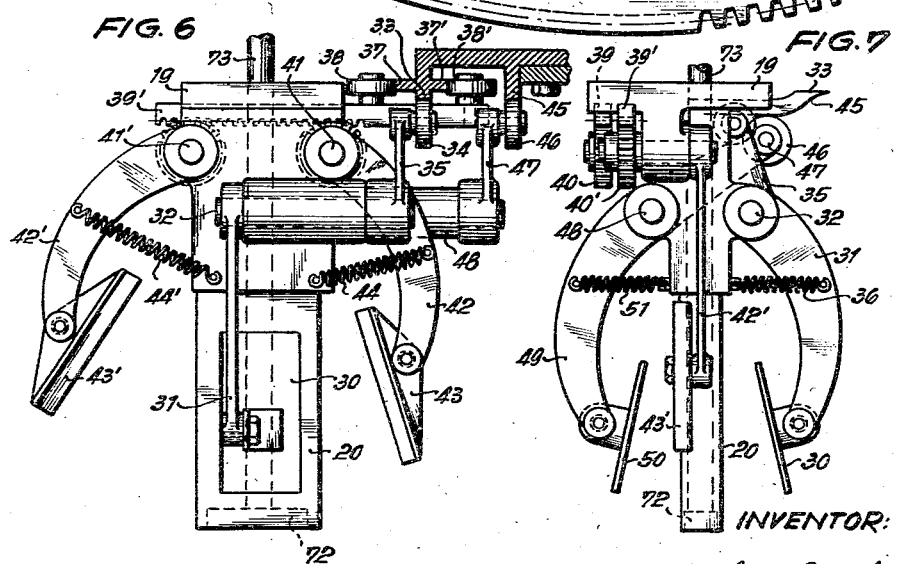
INVENTOR:
Arthur Ritscher,
by Singer, Stern & Carlburg,
Attorneys.

Jan. 28, 1958     A. RITSCHER     2,821,054
APPARATUS FOR PRODUCING CIGARETTE PACKAGES AND THE LIKE
Filed June 30, 1954     7 Sheets-Sheet 6

INVENTOR:
Arthur Ritscher,
by Singer, Stern & Carlburg
Attorneys.

Jan. 28, 1958  A. RITSCHER  2,821,054
APPARATUS FOR PRODUCING CIGARETTE PACKAGES AND THE LIKE
Filed June 30, 1954  7 Sheets-Sheet 7
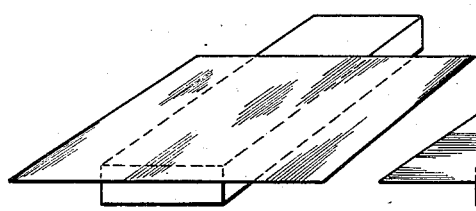
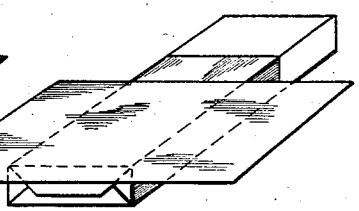
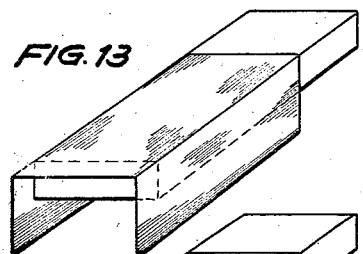
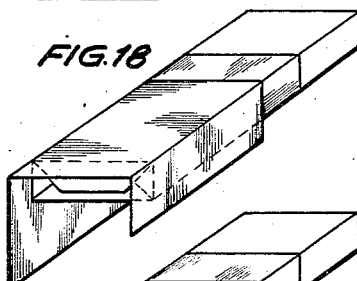
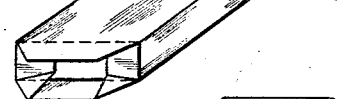
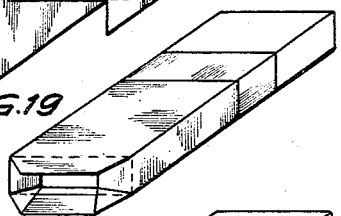
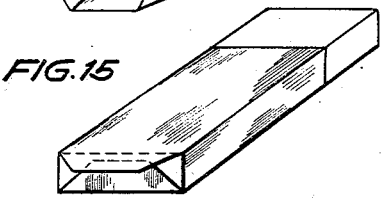
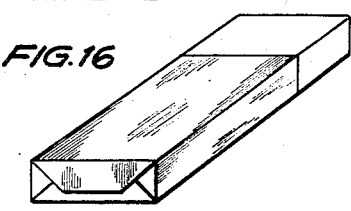
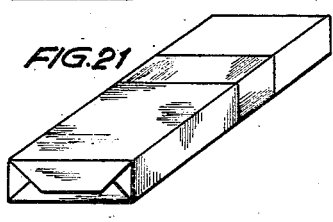
INVENTOR:
Arthur Ritscher,
by Singer, Stern & Carlburg
Attorneys.

United States Patent Office 2,821,054
Patented Jan. 28, 1958

2,821,054

APPARATUS FOR PRODUCING CIGARETTE PACKAGES AND THE LIKE

Arthur Ritscher, Hamburg-Bergedorf, Germany, assignor to Kurt Körber & Co. K.-G., Hamburg-Bergedorf, Germany Application June 30, 1954, Serial No. 440,434

Claims priority, application Germany July 2, 1953

1 Claim. (Cl. 53—170)

The invention relates to a method and a machine for producing cigarette packages and the like open at one end by wrapping and folding one or two shells around hollow forming blocks secured to a wheel rotating on a horizontal axis by means of folder elements, wherein one end of the forming body is formed in each case by a movable plunger which shifts the finished package from the forming block. The invention has for its object to provide a machine of high output with a simplified constructional form.

It is known in machines for packing groups of cigarettes to form packages for cigarettes from wrapper sheets about hollow forming blocks which are secured to carriers rotating step-wise around a horizontal axis. Externally operated plungers are provided in this case in the forming bodies which serve firstly as an end support for closing the packages and then after further rotation of the carrier for the forming blocks and after withdrawal again from the forming block carriers, to force the groups of cigarettes into the forming blocks and to discharge the filled packages from the forming blocks.

Another known machine relates to the production of cigarette packages by folding an inner and an outer shell successively over folding blocks which are fitted to an intermittently moved rotary disc. In this case the packages are folded by folding elements engaging from the outside into the path of the rotary disc, which initially turn down only two of the opposed overhanging flaps of the inner shell against one end of the forming body and then the two still upright flaps of the inner shell and the corresponding end flaps of the outer shell are pressed down together and finally the remaining overhanging end flaps of the outer shell are folded down.

Again a further known machine utilises two discs rotatable successively in opposite directions in vertical planes one of which carries on one side axially directed hollow forming blocks with strippers for the finished packages internally thereof, while the other disc is provided with compartments for receiving the packages running axially in the longitudinal direction, in which the packages are brought out of the forming blocks by means of the above-mentioned strippers in order to be filled at one station. The fitting of the shell around the forming block on the first disc is effected by a folding element engaging from the outside during the stationary cycle. The successively moving rotary table of another machine contains radially disposed forming blocks in order that the folding up of the packages shall be effected during the stoppage of the table.

All these machines have the disadvantage that they only permit a very small output, for the rotary tables have a comparatively large weight and therefore large masses have to be moved which are retarded by the step-wise movement since they must be brought to rest and again accelerated to the working speed. From the known relation: energy=mass×acceleration, the acceleration, i. e. the change in the speed must be made small since otherwise a too-rapid wear of the stressed machine parts occurs. If the weight is made small in order to allow for a higher acceleration for the same energy, even thereby no substantial increase in the output can be obtained.

The aforesaid machines are so constructed that in each case only one package may be filled with cigarettes or the like whereby likewise only a comparatively small output can be obtained. Of course the so-called double-track packing machines are known in which higher outputs can be obtained with a smaller wear of the parts by parallel arranged assemblies; these machines are however expensive to construct owing to the duplicate assemblies and require twice as much attention.

A further disadvantage is that the folding is effected when stationary. The folding elements engage into the path of the forming blocks which only can make a further movement when all the elements have moved out of position; the individual movements of the elements operating from the outside must therefore be effected so quickly during the stoppage of the forming block wheel that high accelerations are necessary which likewise hinder obtaining an increase in the output and in which the form of the cams is unfavourably influenced by the reciprocating movements for example of the plungers for inserting the cigarettes in front of the hollow forming blocks.

In order to eliminate these disadvantages it is therefore proposed according to the invention that the wheel which carries the forming block shall rotate continuously and shall introduce during its travel for example a sheet of tinfoil and a wrapping paper in the rotary path of the rotating wheel, and the package is folded during rotation by folding elements arranged to rotate with the wheel, the cigarette packages are transferred from the forming blocks by plungers lying parallel to the rotary axis of the wheel on to movably mounted holder plates and are laid therefrom on conveyor means travelling in two or more preferably parallel conveyor paths substantially perpendicular to the direction of movement and an assembly of cigarettes is inserted into the packages open on one side. The arrangement on the machine is such that for forming the packages for two or more paths of movement a single tinfoil sheet and a single wrapping paper assembly are provided which are brought opposite the periphery of the wheel at a suitable point of the machine frame. The wheel carries several forming blocks; coaxial thereto is a second wheel running in the same direction with the same number of holder plates so that each folder block of one wheel corresponds to a definite holder plate of the second wheel. The two wheels are driven from the outside and the individual folder elements are actuated by cam discs or drums on the common axis.

After the longitudinal edges have been folded in known manner a device is applied for folding the bottom closure on one end side which folds the base flaps during operation. Thereafter this bottom closure folding apparatus is brought out of engagement again and if a second shell is to be laid around the former the longitudinal sides are again folded and in the same manner the bottom closure is effected. The cigarette package, completed during the continuous rotation of the wheel, is slid off the holder block by a plunger parallel to the common rotary axis and transferred to a holder plate. The package is preferably held there by air. The holder plate is secured to a second wheel which lies coaxially to the first wheel. During the continuous rotation of the second wheel the package is inserted below into the moving path in which the cigarettes are applied, and is filled with cigarettes. The same wheel transfers the package held by the adjacent holder plate on to the conveyor track running parallel thereto in order to be filled here with cigarettes.

Machines are indeed known in which in one circular passage cigarettes are filled in continuous travel; since this however does not utilise forming blocks this machine arrangement does not come into consideration.

Figure 10:
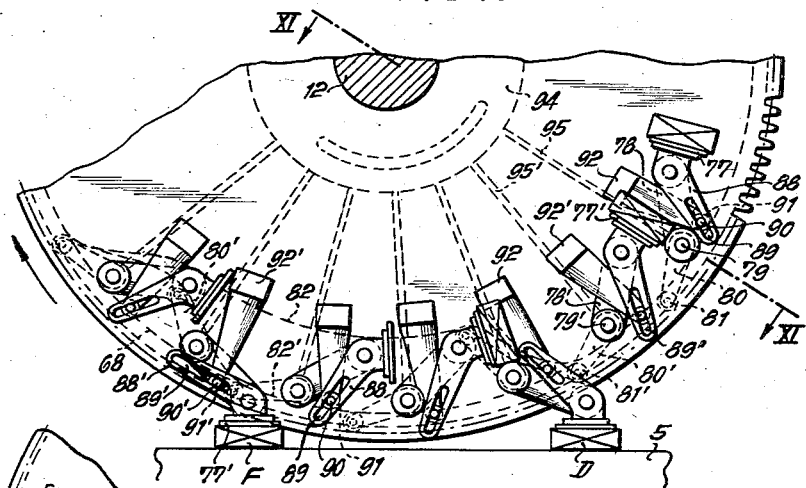
Figure 9:
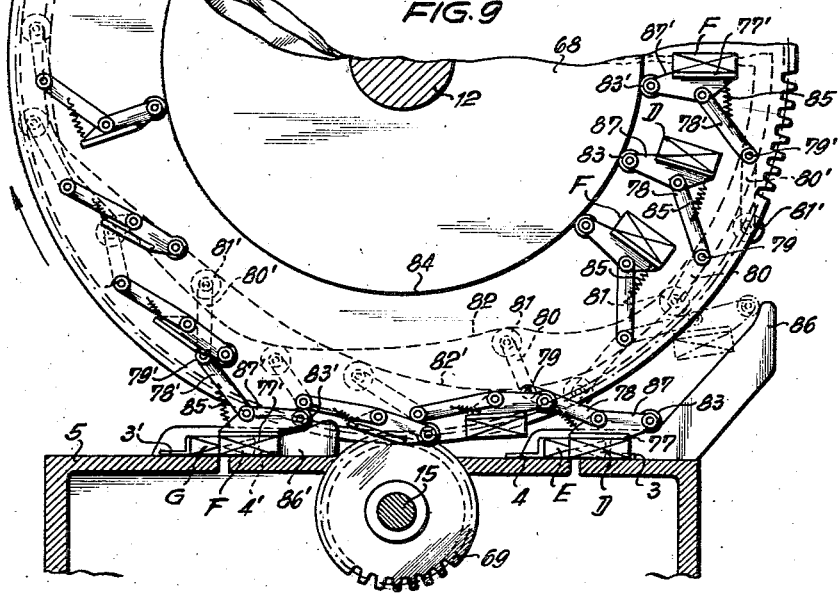

The features of the present invention are shown by way of one constructional example in the accompanying drawings in which:

Fig. 1 shows a packing machine in side view and covers only that part of the machine forming the present invention, Fig. 2 shows a packing machine in front view in the direction of the arrow K in Fig. 1, Fig. 3 is a section on the line III, III in Fig. 1 in the direction of the arrows, Fig. 4 is a section on the line IV, IV of Fig. 3 in the direction of the arrows, Fig. 5 is a section on the line V, V of Fig. 4 in the direction of the arrows, Fig. 6 shows a forming block in front view with the folding elements, Fig. 7 shows a forming block in side view, Fig. 8 is a section on the line VIII, VIII of Fig. 4 in the direction of the arrows, Fig. 9 is a section on the line IX, IX of Fig. 4 in the direction of the arrows, Fig. 10 shows another embodiment of the rocking mechanism for the holder plates, Fig. 11 shows the air feed passages for the holder plates, Figs. 12 to 16 show the production of a package with one shell, Figs. 17 to 21 show the production of a package with a second shell over an already completed inner packing.

The cigarettes are withdrawn by feeders 1 from a magazine 2 (Figs. 1 and 2) and are fed for example in two conveyor tracks between guide rails 3, 4, 3', 4' along a table 5. The feeders 1 are secured to chains 6 driven by chain wheels 7. The chain wheels 7 receive their drive from a motor 8 by means of a chain 9 through a counter-shaft 10. Two bearings 11, 11' are secured to the table 5 (Figs. 1, 2, and 4) in which a shaft 12 is rotatably mounted. A forming block wheel 13 is mounted on the stationary shaft 12 and the wheel 13 is driven through a spur wheel 14 on a shaft 15, through bevel wheels 16, 16' on a shaft 17, chain wheels 18 and 18' and the counter-shaft 10 from the motor 8. Projections 19 are secured to the forming block wheel 13 which for example carry hollow forming blocks 20.

In front of the machine according to Fig. 1 is provided a paper sheet feed apparatus $B_1$ (see Fig. 3) and behind the machine is a tinfoil apparatus B as shown in Fig. 3 which is driven from the shaft 15 through a chain 21. The tinfoil sheet is withdrawn from the reel 22 by means of a pair of rolls 23, passed through preferably rotating cutters 24, 24' to cut it to the appropriate length and brought by pairs of rollers 25 and 26 into the path of the forming blocks 20. The cut off tinfoil strips 27 (Figs. 3 and 5) are laid on a plate 28 provided with an opening 28', are gripped by a forming body 20 during the continuous movement, and are passed through the two brushes 29 and 29', whereby a wrapper is formed as shown in Fig. 13. However before the forming block 20 with the tinfoil strip 27 has reached the brushes 29, 29' a plate 30 (Figs. 6 and 7) secured to a lever 31 has pressed against the forming block 20 and holds the tinfoil strip. The lever 31 is rotatably mounted in a projection 19 on a shaft 32 and is controlled by a stationary cam 33 by means of a roller 34 and a lever 35. A spring 36 draws the lever 31 with the plate 30 firmly against the forming block 20. As soon as the forming block 20 has been passed through the brushes 29, 29' the levers 42, 42' with the folder plates 43, 43' are brought against the forming block 20 by the stationary cams 37, 37' on through rollers 38, 38' racks 39, 39' gear wheels 40, 40' and shafts 41, 41' and close the two projecting flaps of Fig. 13. Levers 42, 42' are drawn by springs 44, 44' firmly against the forming block 20. On further movement of the forming block 20 a lever 49 with a plate 50 fastened thereto controlled from a stationary cam 45 through a roller 46, a lever 47 and a shaft 48 is forced against the forming block 20 by means of a tension spring 51 and holds the tinfoil strip below. The tinfoil strip is thus formed to a tube. In order to fold the base of the package a pusher head 52 (Fig. 4 below) is moved towards the forming block 20 by a drum cam 53 secured to the spindle 12 through a roller 54 and a pusher shaft 55, which is guided in a continuously rotating wheel 68. A roller 57 secured to a rack 56 thereby comes into engagement with a stationary cam 58 as illustrated in the upper part of Fig. 4. The cam 58 (Fig. 8) shifts the roller 57 outwardly and thus the rack 56 mounted in the pusher head 52. Thereby the folders 61, 61' secured on the pins 59, 59' are rocked through 90° by gear wheels 60, 60', and strike against the short side flaps of the tube on the forming block 20 (Fig. 14). Thereupon by a stationary cam 62 and through a roller 63 a double lever 65, secured by a pin 64 in the pusher head 52, is rocked so that one folder plate 62 folds in the lower flap (Fig. 15), and thereafter a folder plate 67 of the adjacent double lever 65 folds in the upper flap of the tube and presses against the forming block 20 (Figs. 15, 16).

The wheel 68 is rotatably mounted on the shaft 12 and is driven in the same direction as the forming wheel 13 (see Fig. 4) by a gear wheel 69 on the shaft 15 so that the folder elements on the pusher head 52 always come precisely opposite the forming blocks 20. If the base of the tinfoil tube is folded the pusher head 52 is again withdrawn by the cam 53.

In the meantime the forming block wheel 13 (see Figs. 3 and 4) has passed from the side of the machine with the tinfoil apparatus B to the adjacent position (Fig. 3) marked A of the machine, to which the wrapper sheet apparatus B' is secured. The spacing of the positions B and B' is in such that the tinfoil wrapper will be completed before the station B' is approached. A wrapper sheet 69 is withdrawn from the stack 70 in known manner provided with adhesive and brought by pairs of rollers 71, 71', 71'' into the path of the forming blocks 20. For the insertion of the wrapper sheet the same folding procedures are repeated during the continued rotation of the forming block wheel 13 with the same folder elements as for the tinfoil shell (Figs. 17 to 21). When the folder plates 67 (see Figs. 4 and 8) finally fold in the upper flaps of the wrapper sheet tube and they press down on to the forming block 20 they remain so long until the position C (Fig. 3) is reached. This time is sufficient for the package to become bonded firmly together around the gummed folding flaps. In the position C the plunger head 52 is withdrawn by the cam 53.

In each of the hollow forming bodies 20 (see Fig. 4 below) is inserted at the base a plunger 72 to which a rod 73 is secured. The rod 73 carries a lug 74 with a roller 75 which engages a drum cam 76 secured to the shaft 12. When the continually rotating forming block wheel 13 reaches the point C (Fig. 3) all the folding elements are moved away from the forming block 20 by the various cams and the rod 73 is moved to the left by the drum cam 76 in Fig. 4. The plunger 72 thus presses against the closed bottom of the package and slides this outwardly from the forming block 20 on to a holder plate 77, 77' (see also Fig. 9). The plunger 72 then moves back immediately with the rod 73 and the empty package is held by suction air on the holder plates 77, 77'. The packages are fed from the holder plates 77, 77' into the conveyor tracks (E, G) in the table 5, formed by the guide rails 3, 4, and 3', 4'. Thereby the packages marked D are transferred into the conveyor path marked E and the packages marked F are fed into the conveyor track marked G.

The transfer procedure is as follows:

The holder plates 77, 77' are pivoted to levers 78, 78' which are rotatably mounted on pins 79, 79' in the wheel 68. Cam levers 80, 80' are located on the pins 79, 79' which are controlled by rollers 81, 81' from disc cams 82, 82' and thereby move the holder plates 77, 77' from the path of the forming blocks. To one arm 87 of each holder plate 77, 77' is further secured a roller 83, 83' respectively which bears against a ring 84 of the wheel 68. The holder plates 77, 77' are forced against the ring 84 by tension springs 85 between levers 78, 78' and the holder plates 77, 77'. If the levers 78, 78' are displaced by the cams 82, 82' the rollers 83, 83' leave the ring 84 and come into engagement with the cams 86, 86' and thus direct the holder plates with the packages located thereon parallel to the table. When the packages D and F have reached the correct position in the conveyor tracks E and G the suction air to the holder plates 77, 77' is cut off in known manner and the packages are left in the conveyor tracks while the holder plates 77, 77' controlled by their cam discs 82, 82' leave the zone of the conveyor tracks. The bundle of cigarettes withdrawn from the cigarette magazine 2 (Fig. 2) are now inserted into the package by the feeders 1 and the so-filled package is fed forward for further treatment.

For the transfer of the finished packages from the holder plates 77, a modified construction may also be adopted in which the ring 84 and the two cam elements 86, 86' are omitted (Fig. 10). Instead of the arm 87 each holder plate 77, 77' embodies an arm 88, 88' which is rigidly connected to the holder plates. The arm has a slot 89, 89' in which a die block 90, 90' can slide and which can rotate about a pin 91, 91' in an arm 92, 92' secured to the wheel 68. The levers 78, 78' and 80, 80' with their pivots 79, 79' in the wheel 68 remain unaltered.

If the holder plate 77, 77' is moved upwardly by means of the cam disc 82, 82' by the levers 78, 78' as before, from the path of the forming blocks, the die block 90, 90' moves along the slot 89, 89' of the arm 80, 80'. Thereby the holder plate 77, 77' with the package is so rocked that these come to lie parallel to the table 5.

The slots can be of curved form—and likewise also the die blocks—so that the path of the holder plates in cooperation with the cam tracks 82, 82' can be influenced to a considerable extent. A spring not shown produces engagement between the rollers 81, 81' and the cam discs 82, 82'.

For the modified construction a suction air pipe known in itself is shown in Fig. 11 which corresponds to the construction according to Fig. 4; it is sufficient however if it is explained for one construction. The holder plates receive the suction air through a bore 93 in the spindle 12 via a control disc 94 through a pipe 95, 95' and through hollow pins 79, 79' and levers 78, 78'.

The construction can obviously be such that only a single packing shell can be produced instead of two packing shells.

What I claim is:

In an apparatus for producing cigarette packages having one end open, comprising a rotary carrier having a plurality of circumferentially spaced former blocks thereon, means to feed sheet material to said rotary carrier in the path of said former blocks, means on said rotary carrier to wrap the sheets circularly about said blocks, a rotary member spaced from the rotary carrier and rotatable about the same axis, means to rotate said rotary carrier and rotary member at the same uniform speed, a plurality of end folding mechanisms on said rotary carrier corresponding in position to said former blocks, a series of holder plates rockably mounted on said rotary member, ejector plungers mounted within each of the former blocks adapted to project a completed package from the former blocks when they reach a predetermined position in their circular travel so that they will be deposited upon said holder plates, a conveyor pathway arranged beneath said rotary member and rotary carrier and extending in parallel relation to the axis thereof, means for feeding bundles of cigarettes along said conveyor pathway, and means for feeding the open end packages to said pathway in advance of said cigarettes with the open end extending in a direction opposite to the direction of travel along said pathway.

References Cited in the file of this patent

UNITED STATES PATENTS

| | | |
|---|---|---|
| Re. 20,881 | Rambold | Oct. 11, 1938 |
| 868,191 | Handfear | Oct. 15, 1907 |
| 1,020,821 | Hesser | Mar. 19, 1912 |
| 1,627,169 | Gangler | May 3, 1927 |
| 1,851,870 | Rose | Mar. 29, 1932 |
| 1,885,910 | Gwinn | Nov. 1, 1932 |